(12) United States Patent
Chen

(10) Patent No.: US 8,336,111 B2
(45) Date of Patent: Dec. 18, 2012

(54) COMMUNICATION DEVICE AND METHOD FOR SECURING DATA

(75) Inventor: Li-Tao Chen, Shenzhen (CN)

(73) Assignees: Shenzhen Futaihong Precision Industry Co., Ltd., ShenZhen, Guangdong Province (TW); Chi Mei Communication Systems, Inc., Tu-Cheng, New Taipei (TW)

( * ) Notice: Subject to any disclaimer, the term of this patent is extended or adjusted under 35 U.S.C. 154(b) by 614 days.

(21) Appl. No.: 12/582,808

(22) Filed: Oct. 21, 2009

(65) Prior Publication Data
US 2010/0211716 A1 Aug. 19, 2010

(30) Foreign Application Priority Data
Feb. 18, 2009 (CN) .......................... 2009 1 0300457

(51) Int. Cl.
*G06F 7/04* (2006.01)
*H04L 12/22* (2006.01)

(52) U.S. Cl. ............. 726/34; 726/30; 380/242; 713/194

(58) Field of Classification Search ........................ None
See application file for complete search history.

(56) References Cited

U.S. PATENT DOCUMENTS
2004/0067772 A1* 4/2004 Gaumain ...................... 455/558
2006/0135208 A1* 6/2006 Lee ................................ 455/558
2006/0240821 A1* 10/2006 Chien ........................... 455/433

FOREIGN PATENT DOCUMENTS
CN     1547863 A     11/2004
CN     1645951 A     7/2005

* cited by examiner

*Primary Examiner* — Venkat Perungavoor
(74) *Attorney, Agent, or Firm* — Altis Law Group, Inc.

(57) ABSTRACT

A communication device and method for securing data include connecting a processor and at least one storage device via active pins of a switch in the communication device, and setting a secure command for securing data stored in the at least one storage device. The communication device and method further include invoking the secure command to delete the data in the at least one storage device, if text data of a received message matches the secure command, and switching the active pins to the inactive pins so as to disconnect the processor and the at least one storage device, thereby disabling the at least one storage device.

19 Claims, 6 Drawing Sheets

COMMUNICATION DEVICE AND METHOD FOR SECURING DATA

BACKGROUND

1. Technical Field

Embodiments of the present disclosure relate to managing data, and more particularly to a communication device and method for securing data in the communication device.

2. Description of Related Art

Communication devices may be used to store various kinds of private information, such as personal data, phone lists, message records, trading information and call histories, for example. In case that the communication devices are lost, the private information might leak out. Since such private information may be confidential, and leakage of such private information may result in many problems.

What is needed, therefore, is an improved communication device and method for securing data in the communication device.

BRIEF DESCRIPTION OF THE DRAWINGS

FIG. 5-1 and FIG. 5-2 are flowcharts of one embodiment of a method for securing data in the communication device of FIG. 1.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
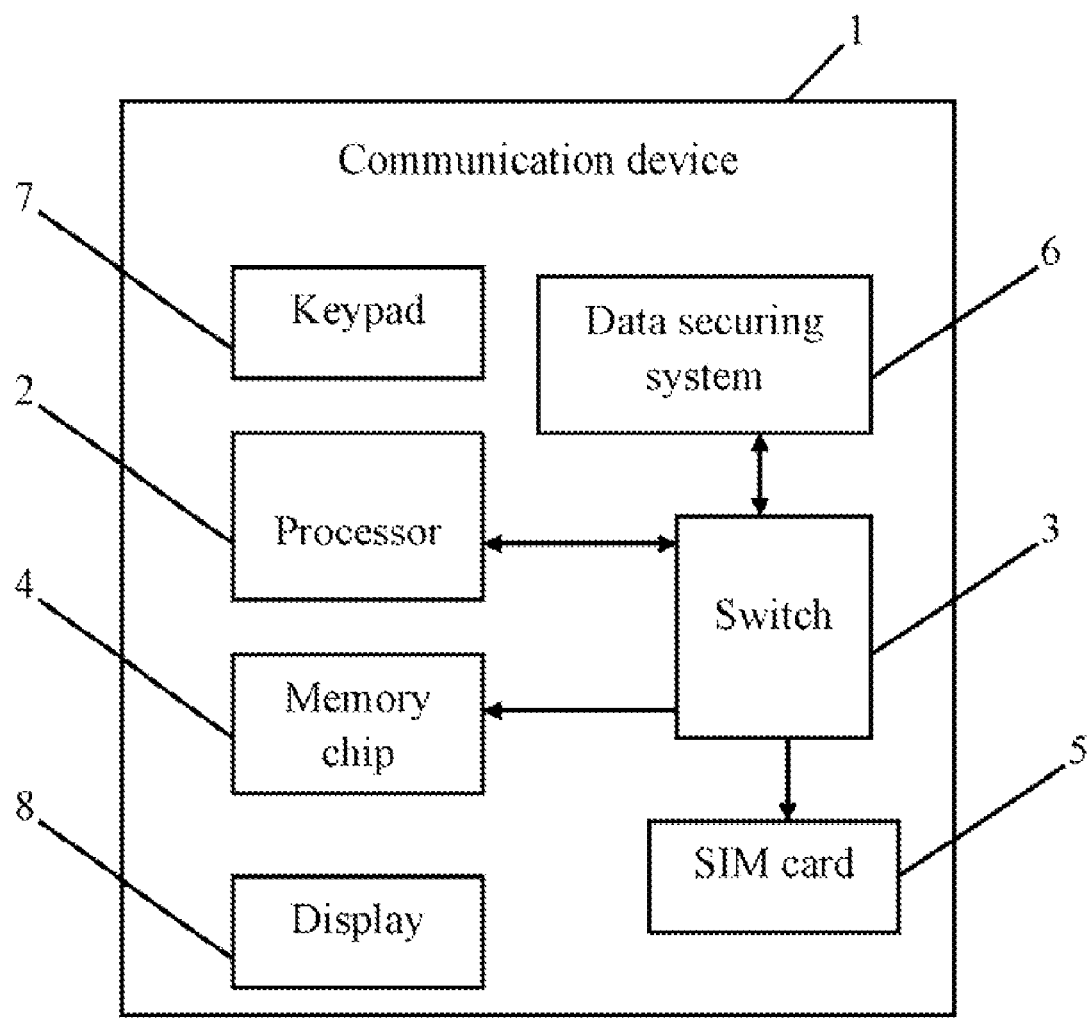
FIG. 1 is a block diagram of one embodiment of a communication device including a data securing system.

FIG. 1 is a block diagram of one embodiment of a communication device 1 including a data securing system 6. The communication device 1 also includes one or more storage devices, such as a memory chip 4 and a subscriber identification module (SIM) card 5, for example. The data securing system 6 may be used to secure data stored in the one or more storage devices 4, 5 when the communication device 1 is in an abnormal state, for example, when the communication device 1 is lost or stolen. In one embodiment, the data securing system 6 may secure the data by deleting the data in the one or more storage devices 4, 5, formatting the one or more storage devices 4,5, and/or disabling the one or more storage devices 4, 5.

The communication device 1 may be a mobile phone, a personal digital assistant, a handheld computer, or any other kind of computing device. The one or more storage devices 4, 5 stores one or more programs, such as programs of an operating system, other applications of the communication device 1, and various kinds of data, such as contact information, messages, or E-mails, for example.

In one embodiment, the storage devices in the communication device 1 may include a memory of the communication device 1 (e.g., the memory chip 4) and an external storage card, such as the SIM card 5, a memory stick, a smart media card, a compact flash card. In another embodiment, the storage devices may be any kind other types of memory card.

The communication device 1 also includes a processor 2, a switch 3, a keypad 7, and a display 8. The processor 2 executes one or more computerized operations of the communication device 1 and other applications, to provide the functions of the communication device 1. The switch 3 may include active pins and inactive pins. The active pins may be used to connect the processor 2 to the storage devices 4, 5, so as to enable access to the storage devices 4, 5. For example, if the processor 2 connects to the storage devices 4, 5 through the active pins of the switch 3, the processor 2 may access data stored in the storage devices 4, 5. In another example, if the processor 2 connects to the storage devices 4, 5 through the inactive pins of the switch 3, the storage devices 4, 5 are disabled. That is, the processor 2 cannot access the data in the storage devices 4, 5, and the data cannot be transferred from the storage devices 4, 5 so as to avoid data/information leakage. In one embodiment, the processor 2 may by default connect to the storage devices 4, 5 through the active pins of the switch 3. Details of the switch 3 will be provided below.

Figure 2:
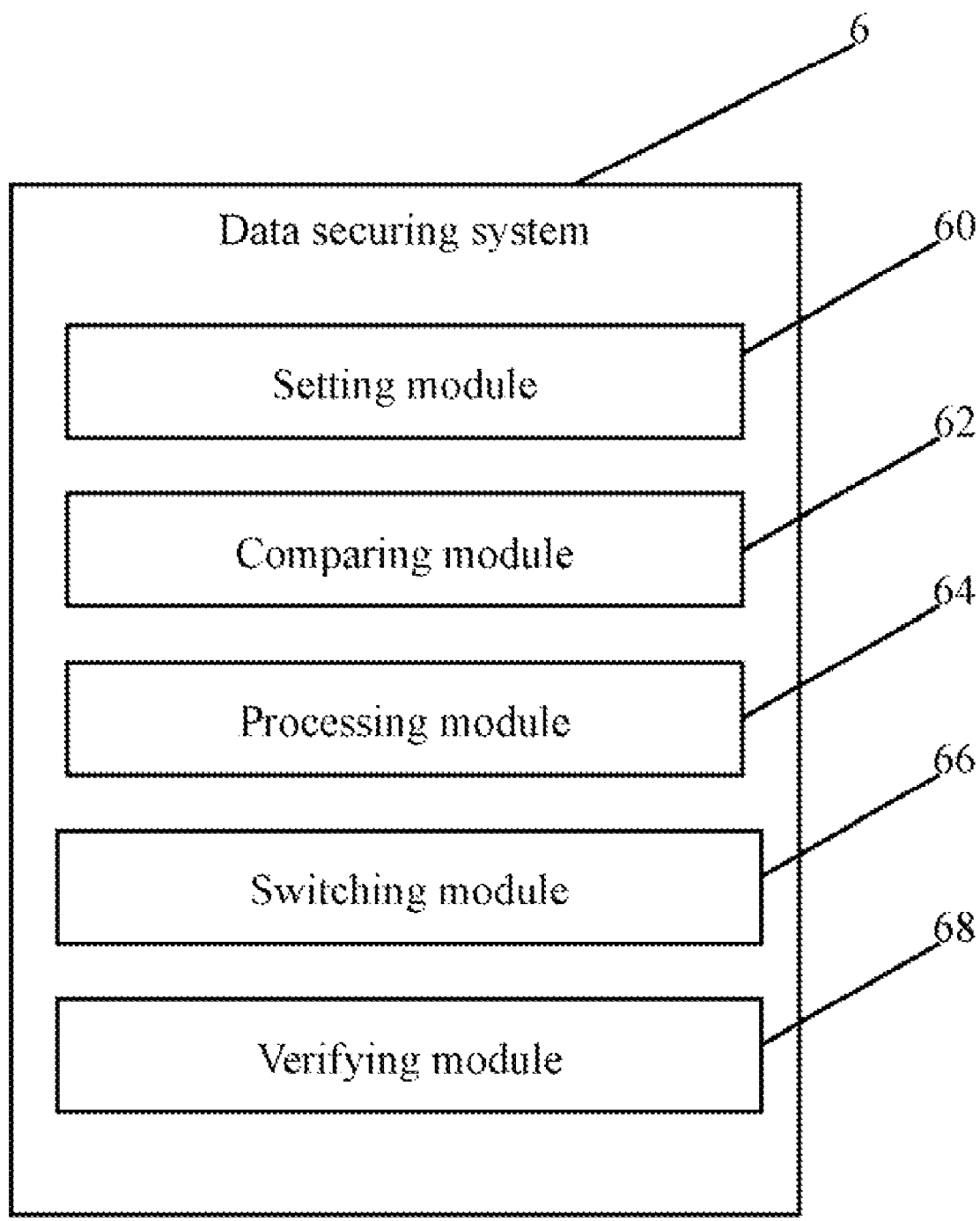
FIG. 2 is a block diagram of one embodiment of the data securing system.

FIG. 2 is a block diagram of one embodiment of the data securing system 6. In one embodiment, the data securing system 6 includes a setting module 60, a comparing module 62, a processing module 64, a switching module 66, and a verifying module 68. The modules 60, 62, 64, 66, and 68 may comprise one or more computerized codes to be executed by the processor 2 to perform one or more operations of the communication device 1. Details of these operations will be provided below.

The setting module 60 is operable to set a password to login to the communication device 1, and set a hotkey to invoke the data securing system 6. The hotkey may be any key-press or a combination of multiple key-presses on the keypad 7 of the communication devices, such as "@56@," for example.

The setting module 60 is also operable to set a secure command for securing the data stored in the storage devices 4, 5. The secure command may be a character string including numbers, alphabets, and/or symbols. The secure command may be invoked by keypad input of the communication device 1, or by identification of a received message including the secure command. In one embodiment, the secure command may be used to delete the data stored in the storage devices 4, 5, format the storage devices 4, 5, and/or disable the storage devices 4, 5.

When the data securing system 6 is invoked, the comparing module 62 compares text data of a received message with the secure command, and determines if the text data of the received message matches the secure command.

If the text data of the received message matches the secure command, the processing module 64 invokes the secure command to secure the data in the storage devices 4, 5, such as by deleting the data in the storage devices 4, 5, and/or formatting the storage device 4, 5, for example. Otherwise, if the text data of the received message does not match the secure command, the processing module 64 displays a dialog box on the display 8 to prompt that the communication device 1 has received a new message.

The switching module 66 switches the active pins of the switch 3 to the inactive pins so as to disconnect the processor 2 and the storage devices (e.g., the memory chip 4 and the SIM card 5), thereby disabling the storage devices 4, 5. In one embodiment, if the storage devices 4, 5 are disabled, the processor 2 cannot access the storage devices 4, 5 any more, for example, the data stored in the storage devices 4, 5 cannot be read or deleted.

Figure 3:
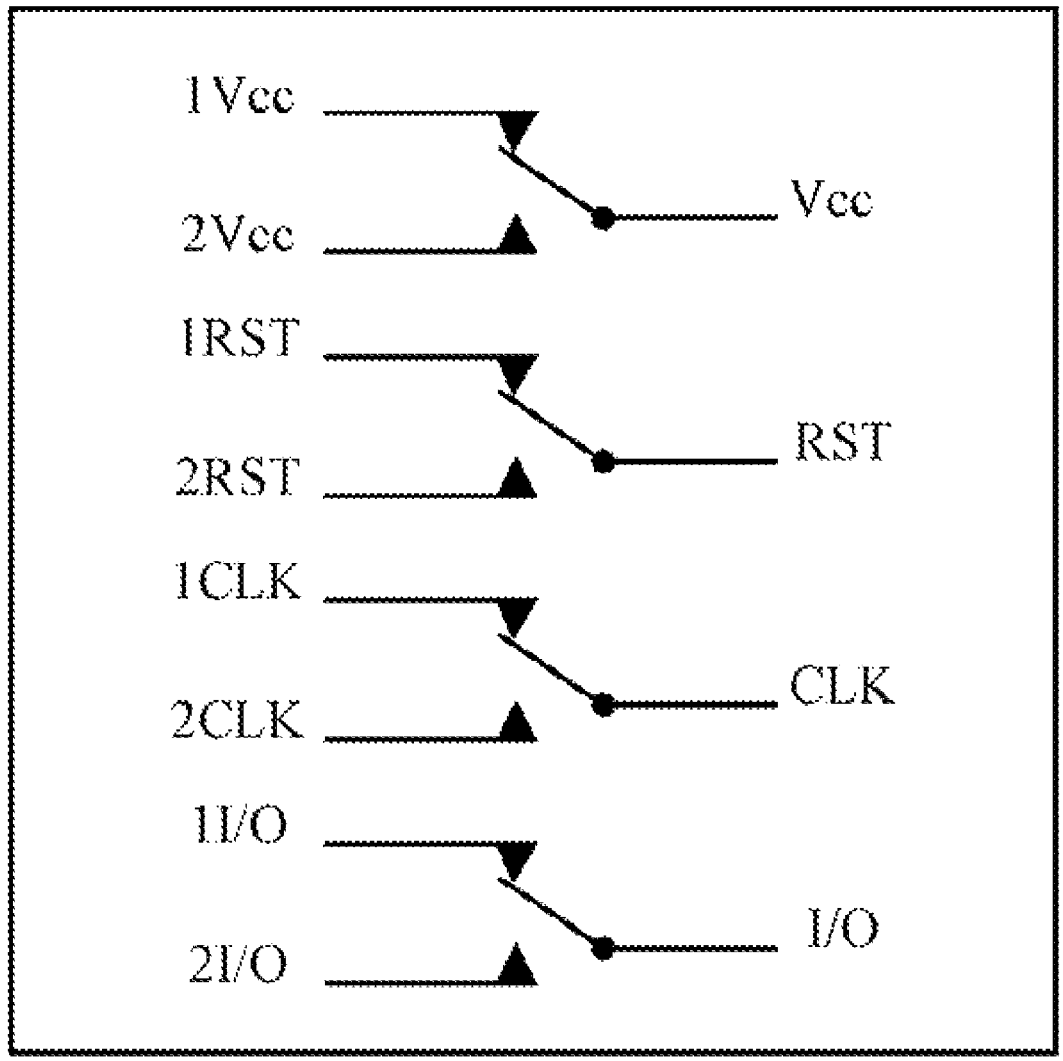
FIG. 3 is a schematic diagram of one embodiment of pins of a switch in the communication device of FIG. 1.

Referring to FIG. 3, which is a schematic diagram of one embodiment of pins of the switch 3 in the communication device of FIG. 1. In one embodiment, as shown in FIG. 3, the switch 3 has three sets of pins, a first set of active pins connected with the processor 2, a second set of active pins connected with the SIM card 5, and a third set of inactive pins. In another embodiment, the switch 3 may have more sets of active pins and/or inactive pins to connect other storage devices 4, 5, such as the memory chip 4, memory stick, for example.

The first set of active pins connected with the processor 2 may include a power supply pin (Vcc), a reset pin (RST), a clock pin (CLK), an input/output pin (I/O), and a ground pin (GND), for example. The second set of active pins connected with the SIM card 5 may include 1Vcc, 1RST, 1CLK, 1I/O, for example. The third set of inactive pins may include 2Vcc, 2RST, 2CLK, 2I/O, for example. When the switch 3 connects the processor 2 and the SIM card 5 using the first set of active pins and the second set of active pins, the SIM card 5 is enabled. Otherwise, if the switch 3 connects the processor 2 and the SIM card 5 using the first set of active pins and the third set of inactive pins, the SIM card 5 is disabled.

In one embodiment, if the communication device 1 is lost, a user of the communication device 1 may send a message including the secure command to the communication device 1. Then the comparing module 62, the processing module 64, and the switching module 66 of the data securing system 6 may identify the secure command and invoke the secure command to ensure data security and avoid data leakage.

If the SIM card 5 of the communication device 1 has been replaced, the communication device 1 does not receive the message including the secure command. To protect the data in the storage devices 4, 5, the verifying module 68 may verify if the SIM card 5 in the communication device 1 has been replaced.

It may be understood that every SIM card has an unique International Mobile Subscriber Identity (IMSI) code, which is read by each communication device when each communication device is powered on. The verifying module 68 records an IMSI code of a SIM card of the communication device 1 each time the communication device 1 is powered on, and determines if the SIM card 5 of the communication device 1 has been replaced by determining if a currently recorded IMSI code is the same as a recorded IMSI code of the SIM card 5. If the currently recorded IMSI code is the same as the recorded IMSI code of the SIM card 5, the verifying module 68 determines that the SIM card 5 is not replaced. Otherwise, if the currently recorded IMSI code is different from the recorded IMSI code of the SIM card 5, the verifying module 68 determines that the SIM card 5 has been replaced.

The verifying module 68 further prompts the user to input a password if the SIM card 5 has been replaced, and determines if the input password is valid according to the set password. If the input password is valid, an operating system (OS) of the communication device 1 can be accessed The setting module 60 is further operable to preset a maximum login attempt for limiting login attempt failure of an inaccurate password. The verifying module 68 further counts the login attempt failure, and determines if the login attempt failure is equal to the preset maximum login attempt.

If the login attempt failure is equal to the preset maximum login attempt, the processing module 64 invokes the secure command to delete the data stored in the storage devices 4, 5, and/or format the storage devices 4, 5. Then the switching module 66 switches the active pins of the switch 3 to the inactive pins so as to disconnect the processor 2 and the storage devices 4, 5. If the login attempt failure is less than the preset maximum login attempt, the verifying module 68 prompts the user to input a password until the login attempt failure is equal to the preset maximum login attempt or the inputted password is verified to valid.

Figure 4:
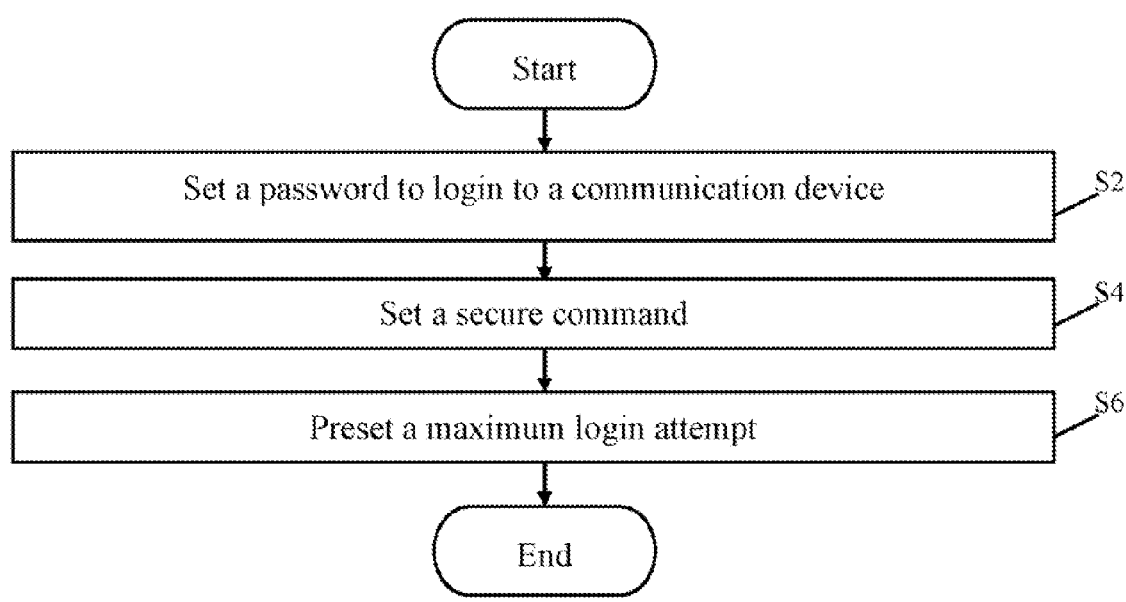
FIG. 4 is a flowchart of one embodiment of a method for setting relevant data in the communication device of FIG. 1.

FIG. 4 is a flowchart of one embodiment of a method for setting relevant data in the communication device 1 of FIG. 1. Depending on the embodiment, additional blocks may be added, others removed, and the ordering of the blocks may be replaced.

In block S2, the setting module 60 sets a password to login to the communication device 1.

In block S4, the setting module 60 sets a secure command for securing the data stored in the storage devices 4, 5. As mentioned above, the secure command may be a character string including numbers, alphabets, and/or symbols. In one embodiment, the secure command may be used to delete the data stored in the storage devices 4, 5, format the storage devices 4, 5, and/or disable the storage devices 4, 5.

In block S6, the setting module 60 presets a maximum login attempt for limiting login attempt failure of an inaccurate password.

Figures 1, 5:
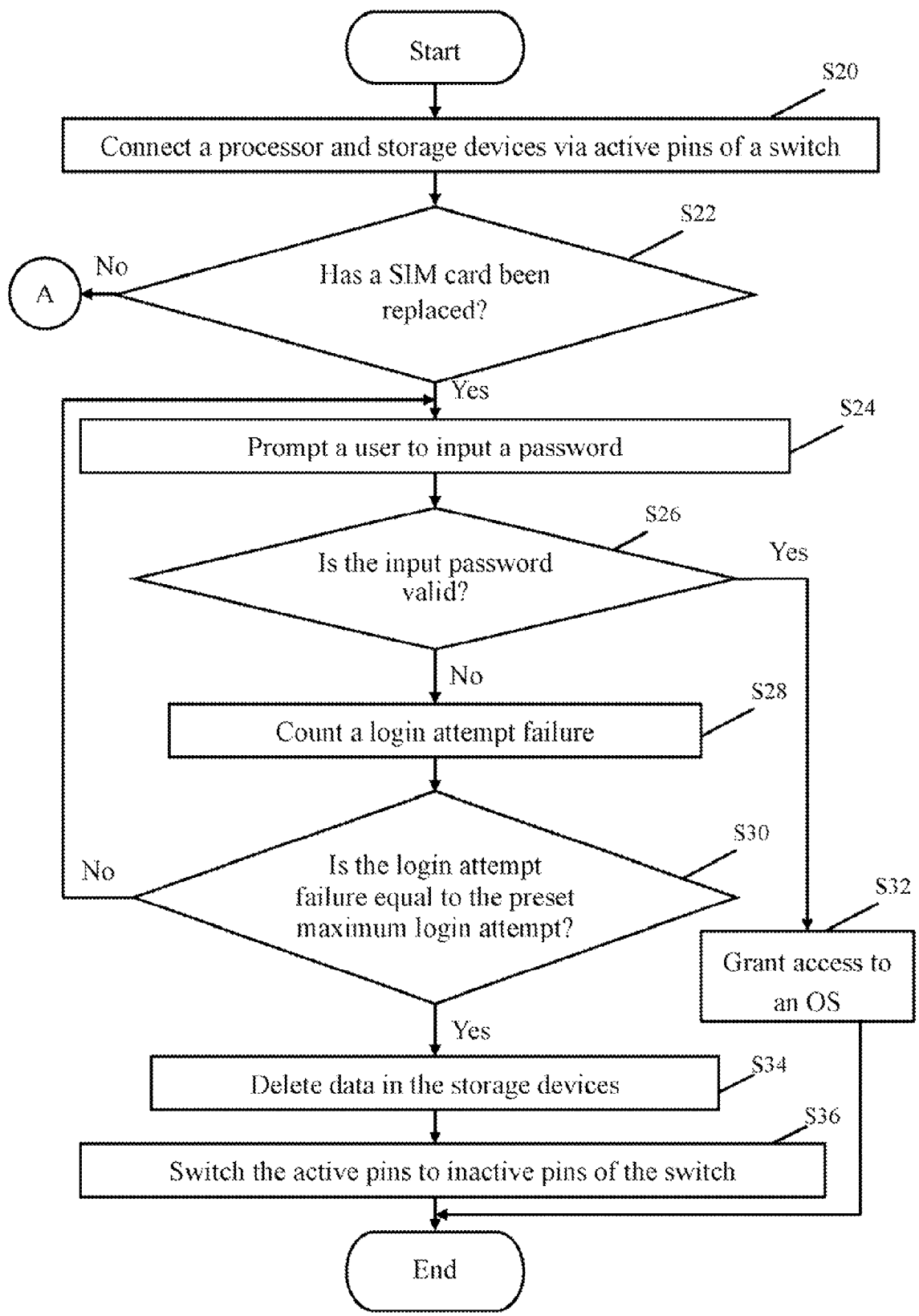
Figures 2, 5:
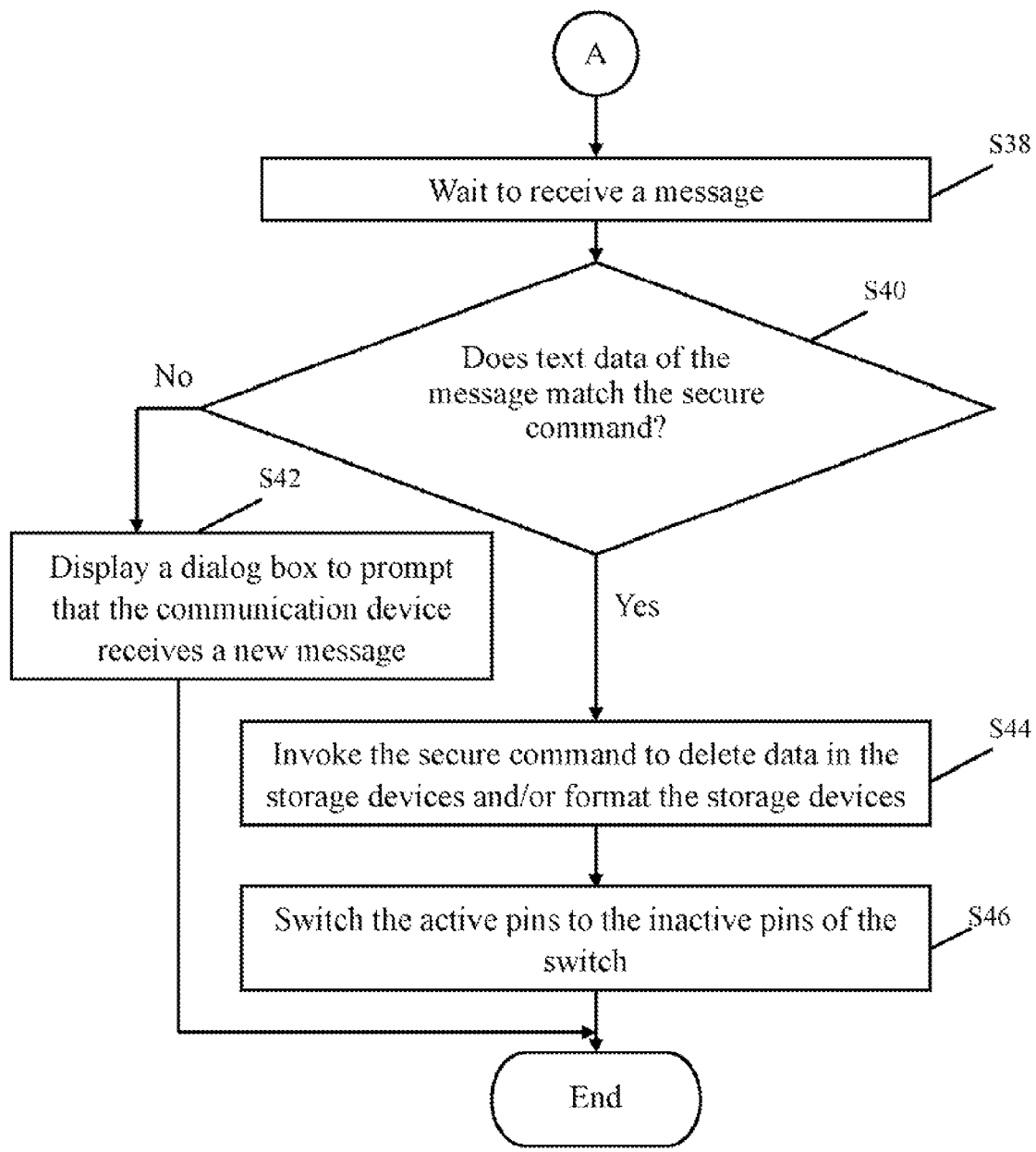

FIG. 5-1 and FIG. 5-2 are flowcharts of one embodiment of a method for securing data in the communication device 1 of FIG. 1. Depending on the embodiment, additional blocks may be added, others removed, and the ordering of the blocks may be replaced.

In block S20, the switch is connected the processor 2 and the storage devices 4, 5 using the active pins of the switch 3.

In block S22, the verifying module 68 verifies if the SIM card 5 in the communication device 1 has been replaced by comparing a currently recorded IMSI code and a recorded IMSI code of the SIM card 5. If the currently recorded IMSI code is the same as the recorded IMSI code of the SIM card 5, the verifying module 68 determines that the SIM card 5 has been replaced. Otherwise, if the currently recorded IMSI code is different from the recorded IMSI code of the SIM card 5, the verifying module 68 determines that the SIM card 5 is not replaced.

If the SIM card 5 has been replaced, in block S24, the verifying module 68 prompts a user to input a password before logging the communication device 1. In block S26, the verifying module 68 determines if the input password is valid according to the set password. If the input password is valid, in block S32, the communication device 1 grants access to an operating system of the communication device 1.

If the input password is not valid, in block S28, the verifying module 68 counts a login attempt failure. In block S30, the verifying module 68 determines if the login attempt failure is equal to the preset maximum login attempt.

If the login attempt failure is equal to the preset maximum login attempt, in block S34, the processing module 64 invokes the secure command to delete data stored in the storage devices 4, 5 of the communication device 1, and/or format the storage devices 4, 5. In block S36, the switching module 66 switches the active pins of the switch 3 to the inactive pins so as to disconnect the processor 2 and the storage devices 4, 5, thereby disabling the storage devices 4, 5.

If the login attempt failure is less than the preset maximum login attempt, the procedure returns to block S24.

If the SIM card 5 is not replaced, in block S38, the communication device 1 waits to receive a message from any other communication device.

In block S40, the comparing module 62 compares text data of the received message with the secure command, and determines if the text data of the received message matches the secure command. If the text data of the received message does not match the secure command, in block S42, the processing module 64 displays a dialog box on the display 8 to prompt that the communication device 1 has received a new message.

If the text data of the received message matches the secure command, in block S44, the comparing module 62 determines that the received message is the secure command, and the processing module 64 invokes the secure command to delete the data stored in the storage devices 4, 5, and/or format the storage devices 4, 5.

In block S46, the switching module 66 switches the active pins of the switch 3 to the inactive pins so as to disconnect the processor 2 and the storage devices 4, 5, thereby disabling the storage devices 4, 5.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for securing data in a communication device, the communication device comprising a processor, at least one storage device, and a switch, the switch comprising active pins and inactive pins, the method comprising:
   connecting the processor and the at least one storage device via the active pins of the switch to enable access to the at least one storage device;
   setting a secure command for securing data stored in the at least one storage device;
   receiving a message by the communication device;
   comparing text data of the received message with the secure command, and determining whether the text data of the received message matches the secure command;
   invoking the secure command to delete the data in the at least one storage device, when the text data of the received message matches the secure command; and
   switching the active pins to the inactive pins to disconnect the processor and the at least one storage device, thereby disabling the at least one storage device.

2. The computer-implemented method according to claim 1, wherein the at least one storage device is a subscriber identity model (SIM) card, a memory chip, or a memory stick.

3. The computer-implemented method according to claim 1, wherein when one of the at least one storage device is a SIM card, the method further comprises:
   setting a password to login to the communication device;
   verifying whether the SIM card in the communication device has been replaced before the step of receiving a message by the communication device;
   prompting a user to input a password when the SIM card has been replaced;
   determining whether the input password is valid according to the set password; and
   invoking the secure command to delete the data in the at least one storage device, and switching the active pins to the inactive pins to disconnect the processor and the at least one storage device, when the input password is not valid.

4. The computer-implemented method according to claim 3, further comprising:
   entering an operating system of the communication device when the input password is valid.

5. The computer-implemented method according to claim 1, further comprising:
   displaying a dialog box on a display of the communication device to prompt that the communication device has received a new message when the text data of the received message does not match the secure command.

6. The computer-implemented method according to claim 1, before the switching step further comprising:
   formatting the at least one storage device.

7. A communication device, the communication device comprising:
   at least one storage device for storing data;
   at least one processor;
   a switch comprising active pins and inactive pins, the active pins connecting the at least one processor and the at least one storage device to enable access to the at least one storage device; and
   one or more programs stored in the storage system and being executable by the at least one processor, the one or more programs comprising:
   a setting module operable to set a secure command for securing the data stored in the at least one storage device;
   a comparing module operable to compare text data of a received message with the secure command, and determine whether the text data of the received message matches the secure command;
   a processing module operable to invoke the secure command to delete the data in the at least one storage device when the text data of the received message matches the secure command; and
   a switching module operable to switch the active pins to the inactive pins to disconnect the at least one processor and the at least one storage device, thereby disabling the at least one storage device.

8. The communication device according to claim 7, wherein the at least one storage device is a subscriber identity model (SIM) card, a memory chip, or a memory stick.

9. The communication device according to claim 7, wherein the setting module is further operable to set a password to login to the communication device.

10. The communication device according to claim 9, wherein the one or more programs further comprise a verifying module operable to verify whether the SIM card in the communication device has been replaced, prompt a user to input a password when the SIM card has been replaced, and determine whether the input password is valid according to the set password.

11. The communication device according to claim 10, wherein:
   the processing module is further operable to invoke the secure command to delete the data in the at least one storage device when the input password is not valid; and
   the switching module is further operable to switch the active pins to the inactive pins to disconnect the processor and the at least one storage device.

12. The communication device according to claim 11, wherein the processing module is further operable to enter an operating system of the communication device when the input password is valid.

13. The communication device according to claim 7, wherein the processing module is further operable to formatting the at least one storage device.

14. A non-transitory computer readable storage medium storing a set of instructions, the set of instructions capable of being executed by a processor to perform a method for securing data in a communication device, the communication device comprising a processor, at least one storage device, and a switch, the switch comprising active pins and inactive pins, the method comprising:
   connecting the processor and the at least one storage device via the active pins of the switch to enable access to the at least one storage device;
   setting a password to login to the communication device;
   setting a secure command for securing data stored in the at least one storage device;
   receiving a message by the communication device;
   comparing text data of the received message with the secure command, and determining whether the text data of the received message matches the secure command;
   invoking the secure command to delete the data in the at least one storage device, when the text data of the received message matches the secure command; and
   switching the active pins to the inactive pins to disconnect the processor and the at least one storage device, thereby disabling the at least one storage device.

15. The non-transitory computer readable storage medium as claimed in claim 14, wherein the at least one storage device is a subscriber identity model (SIM) card, a memory chip, or a memory stick.

16. The non-transitory computer readable storage medium as claimed in claim 14, wherein when one of the at least one storage device is a SIM card, the method further comprises:
   verifying whether the SIM card in the communication device has been replaced before the step of receiving a message by the communication device;
   prompting a user to input a password when the SIM card has been replaced;
   determining whether the input password is valid according to the set password; and
   invoking the secure command to delete the data in the at least one storage device, and switching the active pins to the inactive pins to disconnect the processor and the at least one storage device, when the input password is not valid.

17. The non-transitory computer readable storage medium as claimed in claim 16, wherein the method further comprises:
   entering an operating system of the communication device when the input password is valid.

18. The non-transitory computer readable storage medium as claimed in claim 14, wherein the method further comprises:
   displaying a dialog box on a display of the communication device to prompt that the communication device has received a new message when the text data of the received message does not match the secure command.

19. The non-transitory computer readable storage medium as claimed in claim 14, wherein the method further comprises:
   formatting the at least one storage device before the switching step.

* * * * *